Fig. 1

Inventor.
Frank G. Nicolaus.
By Allan Livingston
Attorney.

Fig. 3

Jan. 12, 1954 F. G. NICOLAUS 2,665,914
PERMUTATION AND COMBINATION CONTROL CIRCUIT
Filed Jan. 5, 1948 6 Sheets-Sheet 4

Fig. 4.

Inventor
Frank G. Nicolaus
By Allard Livingston
Attorney

Jan. 12, 1954  F. G. NICOLAUS  2,665,914
PERMUTATION AND COMBINATION CONTROL CIRCUIT
Filed Jan. 5, 1948  6 Sheets-Sheet 5

Inventor:
Frank G. Nicolaus
By Allard Livingston
Attorney.

Jan. 12, 1954     F. G. NICOLAUS     2,665,914
PERMUTATION AND COMBINATION CONTROL CIRCUIT
Filed Jan. 5, 1948                         6 Sheets—Sheet 6

Inventor:
Frank G. Nicolaus
By Allard Livingston
Attorney.

Patented Jan. 12, 1954

2,665,914

UNITED STATES PATENT OFFICE 2,665,914

PERMUTATION AND COMBINATION CONTROL CIRCUIT

Frank G. Nicolaus, Chicago, Ill., assignor to Raymond T. Moloney, Chicago, Ill.

Application January 5, 1948, Serial No. 600

23 Claims. (Cl. 273—138)

The principal object of this invention is the provision of a control circuit for a permutation and combination device adapted to set up combinations of circuits in cooperation with a spinning, or other, type of selector, such as exemplified in my Patents Nos. 2,579,241 and 2,627,752.

Viewed from another aspect, it is an object of the invention to provide, in combination with selector-operated switches and an actuating mechanism therefor, electromagnetic means for holding desired switches against further selecting operation by the actuating mechanism; totalizing switch means for detecting which circuits have been set up or selected after said actuating mechanism has substantially completed its operation; lock-out circuit means for preventing faulty operation of the totalizing and detecting switch means, and electro-mechanical controls coacting with the aforesaid devices for cyclic operation of the entire apparatus.

A further object is the provision of electromechanical totalizing means cooperable with selector dial spinning mechanism for timed and guarded operation during a certain stage of the spinning operation.

Still further objects are the provision, in a machine of the class described having selectors movable between starting and selecting positions relative to rotatable selector discs, or circuit control means including various impulse circuits set up by the selectors, a totalizer switch for collecting impulses at a certain time in each operating cycle of the machine, an indexing circuit to detect failure of operation of a selector at a certain time relative to the operation of the totalizer switch, holding means and circuits for preventing operation of a selector at certain times in each cycle or succession of cycles, hold indicating means, together with master operating switch and lockout means and master supervisory power switch means.

Additional objects, advantages, and aspects of novelty and utility pertain to details of the construction and operation of the embodiment described hereinafter in view of the accompanying drawings in which:

Fig. 5 is a perspective fragment of the selector contact banks and holding mechanisms;

Fig. 5-A is a top plan view of the unit of Fig. 5;

*Introductory statement of operation*

Figure 1:
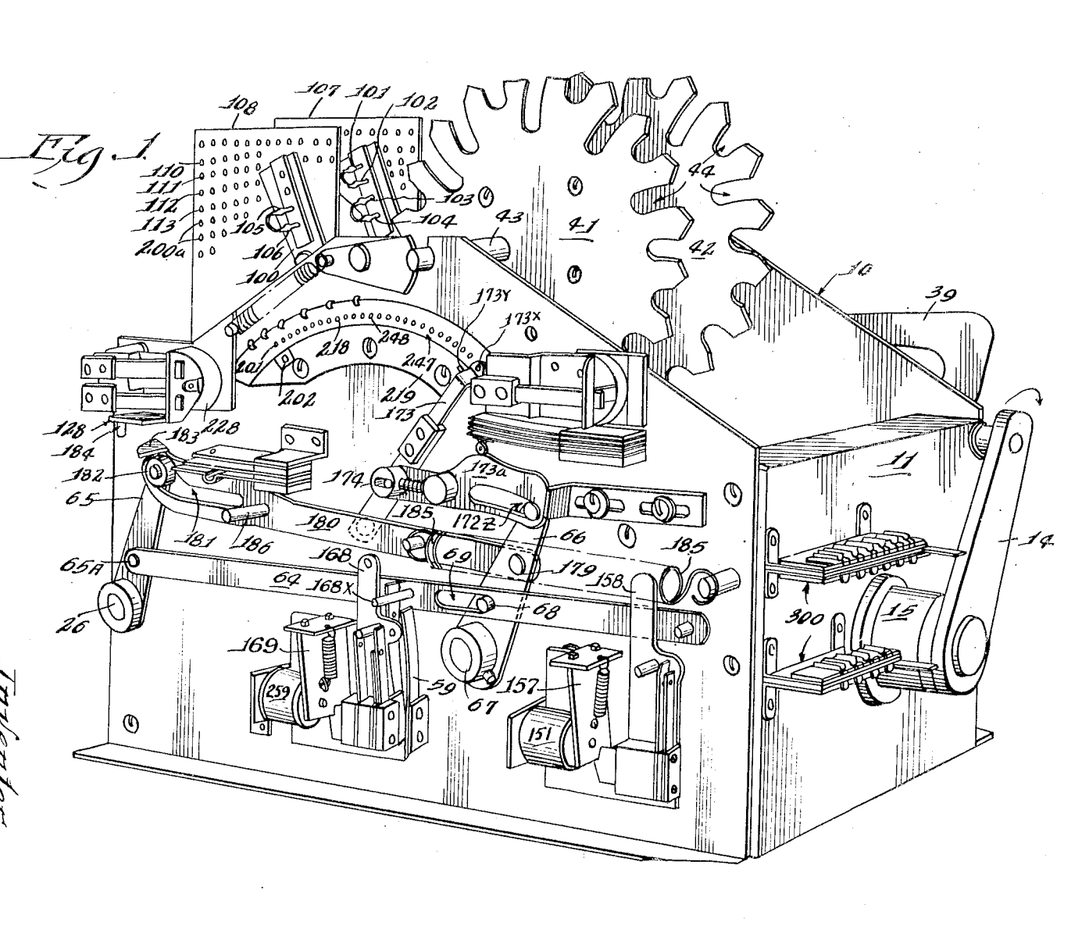
Fig. 1 is a perspective view of a permutation and combination mechanism embodying control-circuit means and features according to the invention.
Figure 6:
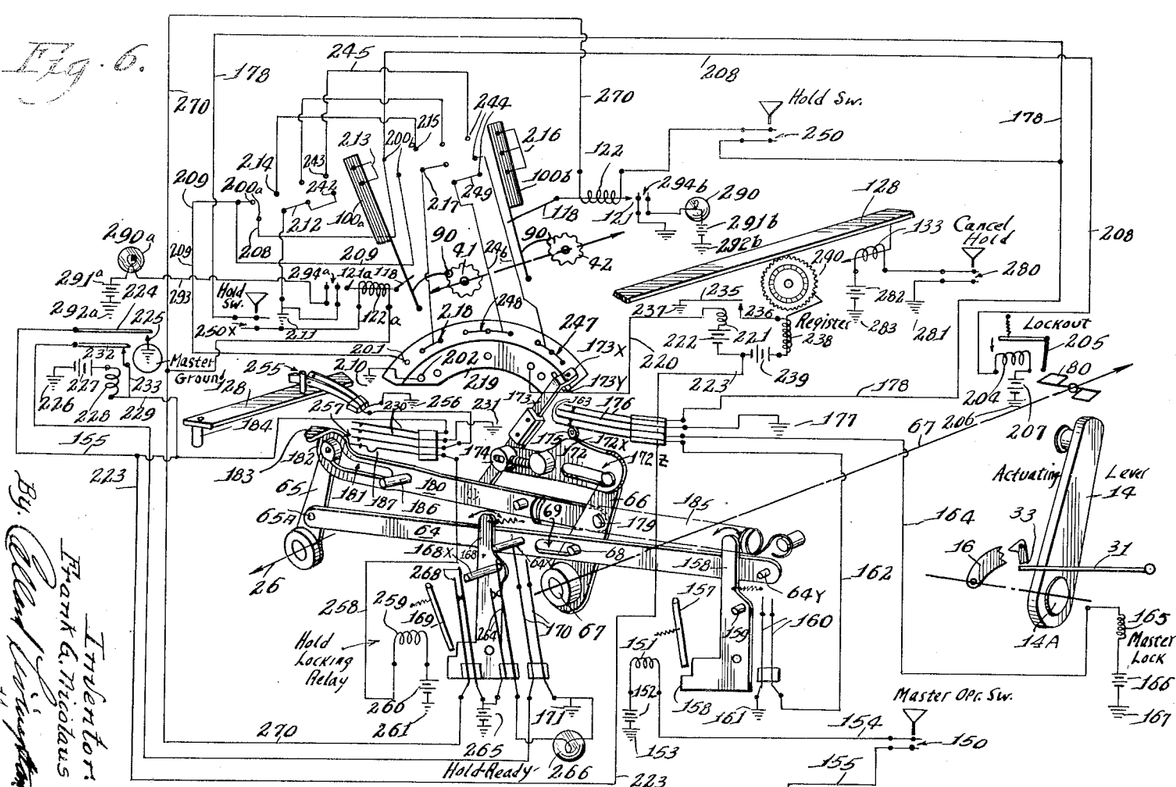
Fig. 6 is a skeletonized schematic of the machine and the control circuits therefor.

Electrical connections are omitted from Fig. 1 but shown in Fig. 6; said connections in Fig. 1 are effected through conventional plug-in connectors 300.

In Fig. 1, actuating lever 14 is moved about 70° manually or by any suitable means provided a master switch (150, Fig. 6) is first operated to release a master lock 31—165. As a result, certain selector and totalizing switch means is set to a starting or initial condition by mechanism including an impositively-linked snap-action cocking and triggering means shown in Fig. 4.

When the parts are moved to initial or starting position and the actuating mechanism triggers, selector pawls 55A (Fig. 4) are in extreme right-hand position in the latter figure; this is also called the indexing position. With the selectors thusly withdrawn from selector discs 41—42, spinning pawls 61 kick out of engagement with said discs clockwise from the condition of Fig. 4, thus spinning the discs, and thereafter a trigger mechanism permits the selector pawls 55A to drop back into selecting slots 44 in discs 41—42, as in Fig. 3.

Figure 4:
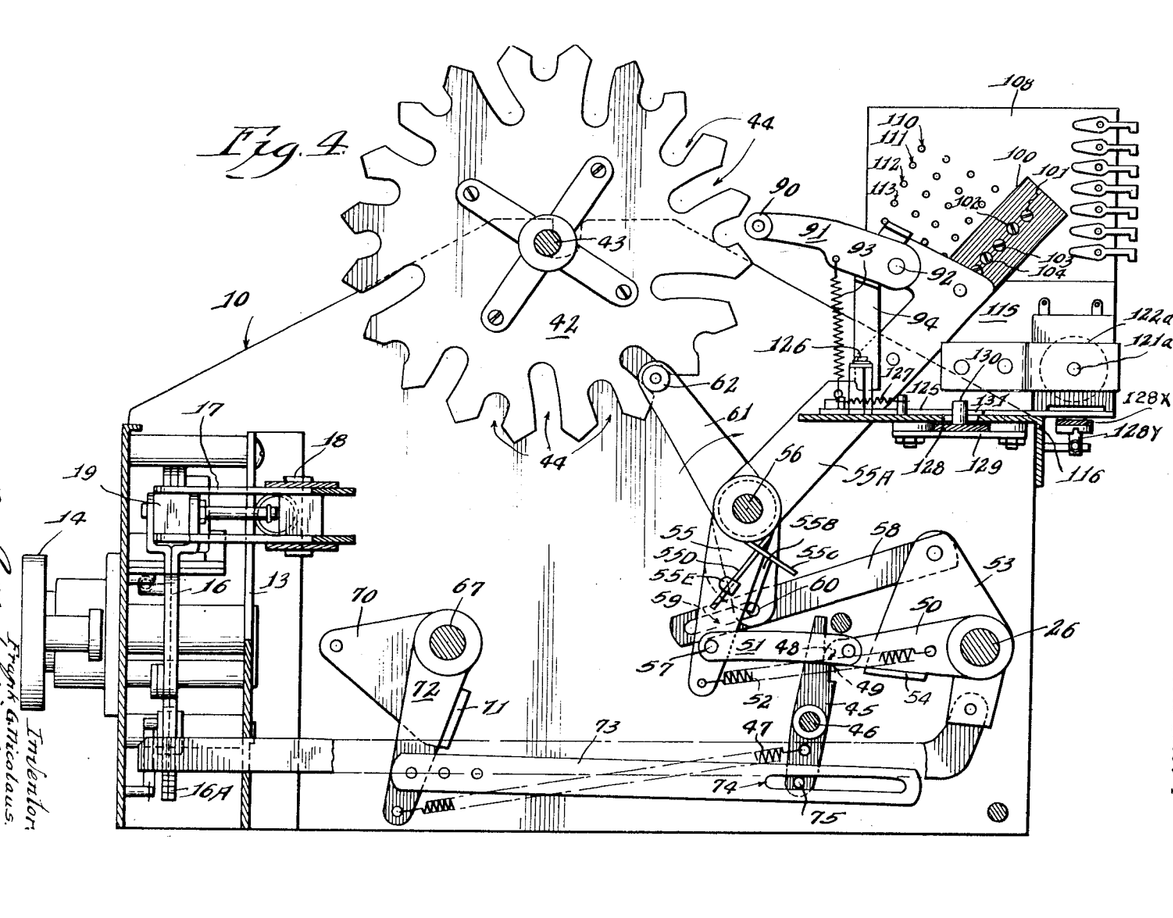
Fig. 4 is a sectional detail similar to that of Fig. 3 but with the parts in triggered or tripped-out condition preparatory to making a selection.

Such positioning of the selector pawls will position selector wiper contacts 101, 102 and 105, 106, etc. Fig. 1 or Fig. 4 on various contacts 110 . . . 113 etc. to set up series circuits through the various banks of selector contacts and associated wipers and thence to totalizing contacts such as 218, 248, etc. in Fig. 1.

When the selectors have completed selecting operation, a totalizer contact 173X, Fig. 1 sweeps back toward the right from starting or indexing position and collects impulses from any hot contacts to operate any desired impulse device such as the totalizer 238—240 shown schematically in Fig. 6.

Any selector may be held at certain times by pushing hold switches 250, 250X, Fig. 6, which results in a blocking of movement of the selector from selecting to indexing position; this is possible owing to the impositive or yieldable driving connections aforesaid.

The holding of selectors may be cancelled at certain times by switch 280, resulting in shifting of a common reset bar for all holding coils and levers.

Since the selector discs are intended to rotate freely, it can happen occasionally that a selector pawl will hang up on dead-center on peripheral parts of said discs instead of falling into a slot;

indexing prevents faulty totalizing due to this action; any selector hung up will cause its associated wiper contacts to remain on indexing contacts such as those indicated at 200a, Fig. 1 or Fig. 6; all indexing contacts are in series-parallel with indexing contacts 201, 202 (Fig. 1) on the starting end of the totalizer switch; thus, if any selector is on dead-center, a circuit is closed through its indexing contacts and the totalizer in indexing position to operate a lockout coil 204 associated with a timer gear train, which stops the operation of the mechanism instantly, so that the totalizer will not leave indexing position.

Generally, mere operation of a part in the machine, even the return of lever 14, or some vibration, dislodges the dead-center selector, whereupon the totalizer continues its operation.

Supervisory switches and signals indicate times when holding may be effected, and which selectors have been held.

Thus, in summary, operation of handle 14 (Fig. 1) effects movement of selector wipers to indexing position on contacts 200a, and movement of totalizer wiper 173 to starting position on contacts 201, 202, with a setting or cocking of spinning mechanism, which when triggered, spins discs 41, 42, and the selector wipers assume various positions on the contact banks on panels 107, 108, whereupon the totalizer or detector wiper 173, 173X travels over contacts 218, etc. and picks up impulses for operation of an indicator or the like.

*Detailed construction*

Figure 3:
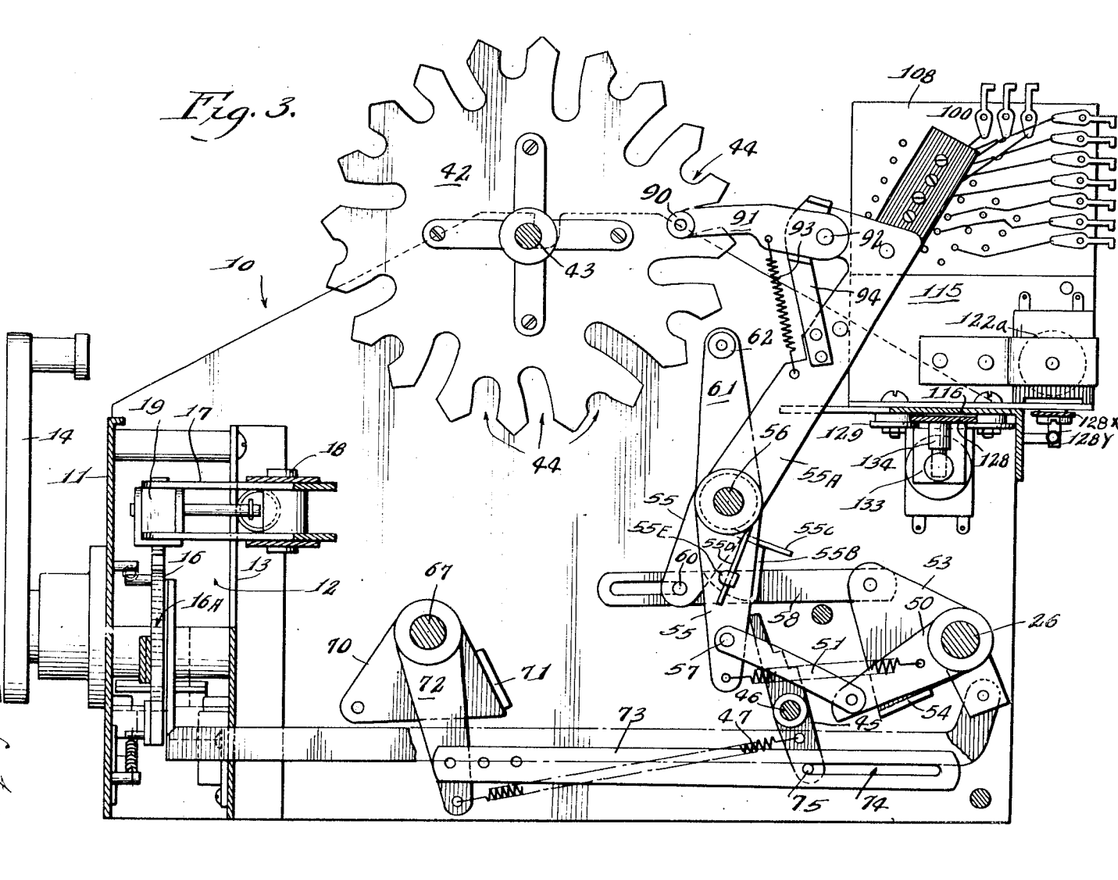
Fig. 3 is a vertical sectional detail through said mechanism with parts at rest in a selecting position.

Referring to Fig. 1, the selecting mechanism and associated control instrumentalities are mounted on a rectangular chassis 10 having a front wall 11 the rear face of which carries an actuating leverage, generally indicated at 12 in Fig. 3, cooperably with a companion plate 13.

Figures 2, 2A:
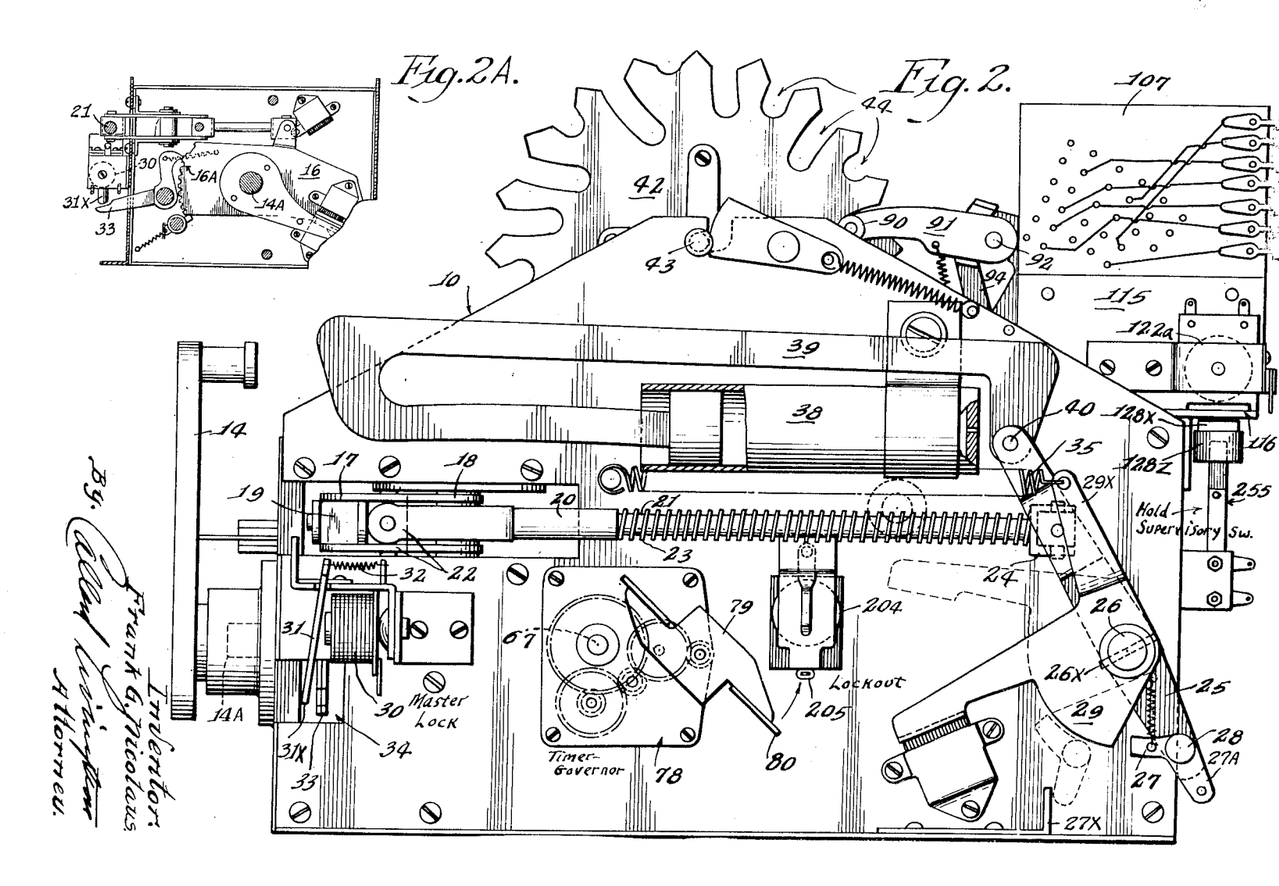
Fig. 2 is a side elevation of the mechanism of Fig. 1.
Fig. 2A is a vertical cross section through the front of the machine showing a rear elevational detail of the lock-out dog means.

As in Fig. 1, this actuating leverage or mechanism includes a lever 14 on a shaft 14A, journaled in a bushing 15, and when lever 14 is freed for movement, it is turned clockwise to transmit similar motion to a coupling plate 16 floating coaxially therewith, in (Fig. 3) consequence of which thrust linkage 17, pivoted as at 18, is rocked toward the right through a universal yoke connection 19 with said coupling plate or lever 16; and as in Fig. 2, the aforesaid rocking of linkage 17 transmits a thrust, toward the right, of drive or thrust rod 20, which is hollow to receive the end of spring rod 21, and which is pivotally connected by a universal joint 22 to said linkage 17.

The foregoing actuating leverage 14—16—17 and associated parts, is described in detail in my Patent No. 2,627,752; accordingly, it is not here described in detail beyond the requirements for understanding how the selecting mechanism may be set into operation.

Attention is called to the fact, however, that the aforesaid actuating leverage is normally locked against operation as a function of the control circuit; this is accomplished by means of a lock-out dog 33 (Fig. 2A) which is spring-urged to engage in ratchet teeth 16A (Fig. 3) of the coupling plate 16 when the latter starts to move to lock said plate, and hence the lever 14, against effective displacement from normal position.

A master release means (Fig. 2) includes an electromagnetic coil 30 mounted on the side of the chassis near the actuating leverage, and provided with a pivoted armature 31 normally displaced by spring 32 so as to be out of the path of the tail 33 of the aforesaid lockout dog, which projects through an opening 34 in the side wall of the chassis to a position where it will engage beneath the lower edge 31X of the armature 31 if the latter is attracted from the normal position shown by coil 30, in which case the lockout dog is prevented from pivoting into locking engagement with the ratchet teeth on the coupling plate, so that the latter, and hence the lever 14, may move to impart thrust motion to the linkage 17 and thrust rod 20. If the master control coil 30 is not energized to attract the armature 31 as aforesaid, then the armature end 31X is not in the path of the dog tail 33 and the lockout dog may pivot in its locking function.

As a result of the actuating thrust imparted as aforesaid to rod 20, this effort is transmitted by a coil spring 23 and universal joint 24 (Fig. 2) to a drive lever 25 floating on a main cross shaft 26 journaled in the chassis, so that drive lever 25 tends to rock clockwise from the normal position shown in Fig. 2, whereby to engage its trip-out dog 27, pivoted thereon as at 28, with the edge of the coupling cam lever 29 on a trip-out lever held fast by pin 26X on shaft 26, so that said trip-out lever is coupled with the drive lever 25 for similar clockwise movement against the normalizing tension of spring 35 engaged with the upper end 29X of lever 29, until the angular relation between the dog 27 and cam portions of 29 becomes such that the dog can trip out suddenly, by engagement of the tail 27A with lug 27X (Fig. 2) thereby uncoupling these driving and driven parts so that the coupling cam 29 is free for anticlockwise motion under urgence of spring 35 to turn the main cross shaft 26 and actuate certain selecting mechanism to be described. The position of the trip-out dog 27 and cam lever 29 at the time of tripping is shown in dotted lines in Fig. 2.

Movements of the actuating mechanism, particularly with respect to the initial, clockwise, setting of drive lever 25, are regulated as to speed by a dashpot 38, Fig. 2, having a plunger arm 39 connected, as at 40, to said drive lever.

As in Fig. 1, the machine is provided with a plurality of selector discs 41, 42, floating freely on cross shaft 43 in the chassis; only two discs have been shown for simplicity, but any larger number may be employed. These selector discs have selection notches 44 of different radial depth formed around the peripheries thereof.

When the main shaft 26 is fully turned to advanced or cocked position, clockwise, Fig. 4, it becomes automatically and temporarily locked in that condition by action of a trigger lever 45 pivoted on shaft 46 and pulled by spring 47 (clockwise) to project one of its locking notches 48 beneath the end 49 of toggle lever 50 floating on shaft 26.

In this condition, toggle lever 50 and its companion lever 51 are cocked into nearly linear extension with their normalizing spring 52 tensioned, said toggle levers having been pivoted into that condition by action of a main spinning lever 53, fast on shaft 26, and hence turned clockwise thereby, Fig. 4, to cause a flange 54 on said lever to rise against and carry with it the toggle lever 50 until the toggle levers are set or cocked as aforesaid.

As a result of the aforesaid cocking of the toggle levers 50—51, a selecting pawl 55, floating on shaft 56 is rocked, clockwise, into non-selecting or withdrawn position, as in Fig. 4, by reason of the pivoted connection 57 of toggle lever 51 therewith.

When the trip-out dog 27 of Fig. 2 trips out, after the main shaft has been set or cocked, clockwise, as aforesaid (dotted lines, Fig. 2), said shaft will at once begin its return, anticlockwise, rocking under urgence of spring 35, and consequently the main spinning lever 53 abruptly begins a similar anticlockwise rocking, urging spinning arm 58, Fig. 4 to the left, so that the end of slot 59 bears against pin 60 on a spinning pawl 61, also floating on shaft 56, and rocks said spinning pawl clockwise with a sudden movement in a direction toward the condition of Fig. 3, in consequence of which roller 62 leaves the radial selecting slot with an arcuate or non-radial sweep sufficient to cause the selecting disc 42 to spin.

Referring now to Fig. 1, the return or working movement of the main shaft 26 will be seen as a clockwise motion in this view, in consequence of which an arm 64, pivotally connected at 65A to a lever 65 on said shaft, is free to shift back toward the right for further control purposes to appear hereinafter.

However, when the main shaft 26 was initially set or cocked the arm 64, Fig. 1, shifted toward the left and carried with it a timer crank 66 on timer shaft 67 by reason of crank pin 68 in slot 69 in arm 64, so that said crank was rotated anticlockwise in Fig. 1 or clockwise in Fig. 4; as a result of the latter described motion of shaft 67, an abutment lever 70, fast on shaft 67, likewise turns clockwise on the initial or setting stroke and causes a flange 71 thereon to bear against a trigger lever 72 floating on shaft 67, thereby pulling trigger arm 73 toward the left, so that the trigger lever 45 is free to lock or hold set the aforesaid toggle mechanism.

When the main shaft 26 trips out and begins its return clockwise motion in Fig. 1, arm 64 shifts back toward the right at its own speed, but the timer crank 66 does not move quite as fast because shaft 67, Fig. 2, terminates in a timing gear train unit generally indicated at 78, which includes a governor fan or spinner 79 driven at a high gear ratio with correspondingly low torque such that a slight obstruction in the path of one of its blade tips 80 is sufficient to arrest the gear train and, in consequence, rotation of timer shaft 67.

The timer unit 78, Fig. 2, slows up the restorative movement of timer shaft 67, Fig. 4, and as a result the movement toward the right of arm 73 is slowed up to give the spinning lever system 53, 58, 61 time to act and spin the selector disc.

When the trigger arm 73 approaches the end of its stroke to the right, the end 74 of an elongated slot therein bears against pin 75, thereby rocking the trigger lever 45 anticlockwise and tripping out the toggle to cause the selecting pawl to advance, as will presently be described.

Trigger and breaking of the toggle as aforesaid, permits spring 52, Fig. 4, to pull the selecting pawl lever 55 in an anticlockwise sense toward the ultimate condition shown in Fig. 3, it being here noted that the selecting pawl actually consists of a lower lever part 55 and an upper feeler or detector part 55A, and the latter is provided with a flange 55B against which bears one end 55C of a coil spring on shaft 56 and having another end 55D bearing against a lug 55E on the lever part 55 to impositively couple lever 55 with the selector part 55A.

Ultimately, the upper selecting pawl part 55A will thrust the roller 90 into one of the selecting slots in disc 42, as in Fig. 3, said roller being on a yieldable finger 91, pivoted as at 92 on the part 55A and normalized by spring 93 against stop 94, in the condition of Fig. 4.

In the usual case, there will be several of the discs 41, 42; and each disc will have its corresponding compound leverage system 50, 51, 53, 55, 58, 61, and triggering means 45, 73, etc. Moreover, there will be associated with each selecting pawl 55A an insulated contact wiper panel 109, Figs. 1 and 4, rigidly attached thereto, and each carrying one or more wiper contacts 101, 102, 103, 104, etc.

As in Figs. 1 and 4, there is associated with each said selector pawl and wiper contact assembly, a contact panel 107 or 108, carrying arcuately situated rows of contacts 110, 111, 112, etc., there being one such arcuate row for each wiper contact 100, etc. of the corresponding selector pawl. Thus, in the arcuate movements of these selector pawls back and forth between the opposite positions shown in Figs. 3 and 4, the wiper contacts 100—104 will sweep over their corresponding rows of fixed contacts.

The radial depths of the selecting slots 44 determine the selecting positions of rest of the selector pawls and are so calculated as to arrest the selecting pawls in positions in which their wiper contacts will be positioned on, and in good electrical contact with, the fixed or stationary contacts at one or another selecting position.

As will appear hereinafter, circuits may be variously set up by the selector pawls, and after the selecting operations are concluded, a detecting switch is actuated at proper time to sense which circuits have been thusly set up.

Figures 5, 5A:
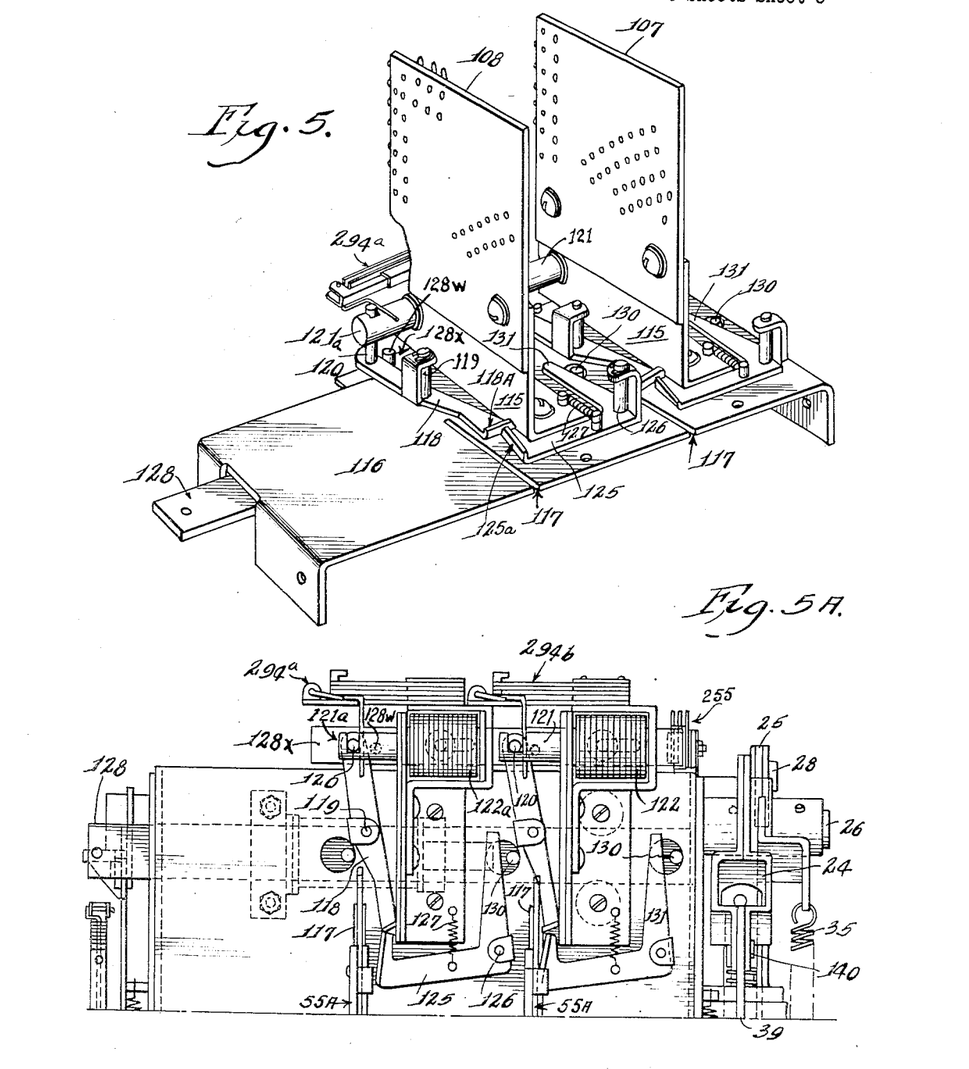

The contact panels 107, 108, are mounted on brackets 115 in turn secured to a common base plate 116 fast on the chassis; this construction is shown to advantage in Fig. 5, wherein it will be observed that a slot 117 is provided in the base plate for alignment with a corresponding selector pawl arm 55A, such that when these pawls are withdrawn, as in Fig. 4, they move back into these slots 117, if not blocked.

The machine includes means for holding any selection or selection pawl in selecting relation with its disc when the actuating mechanism is operated; and this means includes, Fig. 5, a blocking lever 118 pivoted at 119 on the base plate and having pin connection 120 with solenoid plunger 121a of a corresponding holding solenoid 122a, Fig. 4, such that when the solenoid is energized, lever 118 pivots from the normal non-blocking position of Fig. 5 to block movement of the corresponding selector pawl arm 55A back into the slot 117, which in effect holds said pawl in selecting condition, as in Fig. 3, the spring means 55C, 55D of Fig. 4 providing relief, nevertheless, for movement of the other associated pawl actuating parts, such as the toggle means 50, 51, etc.

Whenever one of the pawl blocking levers 118 is moved as aforesaid into blocking position, Fig. 5, it is locked in that condition by a locking pawl 125 pivoted as at 126 on the base plate and pulled by spring 127 to turn in a clockwise sense and position its nose 125A behind the nose 118A of the blocking lever to prevent the latter from being returned to normal non-blocking position (by the solenoid spring, not seen). It is understood that each selecting pawl and contact panel 107, 108, etc. may have associated therewith a blocking lever and locking lever means 118, 125 and solenoid 122a. See also the plan view of Fig. 5-A.

Means common to all selector stations for restoring all blocking or holding levers 118 to normal, includes, Fig. 5 a long shift bar 128, slidably supported on cross-bars 129 (Fig. 4), beneath the base plate, and provided with pins 130 projecting up through said plate aside the tail 131 of each locking lever, such that when said bar is shifted lengthwise of the base plate, toward the left in Fig. 5, said pins 130 will bear against the tails 131 of all locking levers and pivot the latter out of locking relation to corresponding blocking levers 118, so that all of the latter may return to normal non-blocking position. Said shift bar may be operated manually, or by a releasing solenoid 133, Fig. 3, having its plunger pinned as at 134 to said shift bar 128.

*Control circuit*

In Fig. 6 there is depicted a skeletonized schematic of certain parts of the mechanism heretofore described, together with circuit connections for controlling a register circuit for two selector units; this circuit is best described by tracing the operation thereof.

By closing a master operating switch 150, master lock coil 151 is energized, as from power source (represented as a battery) 152, ground 153, conductor 154, contacts of switch 150, closed, conductor 155, and ground 156; this attracts latch armature 157, releasing pivoted bar 158 for clockwise spring movement so that pin 159 closes switch blades 160, thereby applying ground 161 via conductor 162 and normally closed cam switch blades 163, conductor 164 to master lock coil 165, which becomes energized from power source or battery 166 and ground 167.

As a result of the aforesaid energization of the master lock coil, its armature 31 is pulled up to block the locking dog tail 33 mentioned in view of Fig. 2, so that the operating lever 14 may be actuated as heretofore described. The coil 165 corresponds to the master lock coil 30 of Fig. 2.

When the main actuating lever 14 is operated to actuate the mechanism, it will be recalled that all of the free (non-held) selector or detecting pawls 55A and their associated wiper panel contact carriers 100, including those particularly shown in Fig. 6 at 100a, 100b, are retracted to starting position on their respective contact banks; in Fig. 6 this would be an anticlockwise movement from the advanced or selecting position shown, toward the left to the first set of contacts in each instance; this will be more fully explained hereinafter in conjunction with the selecting circuits.

However, as an incident to said initial or cocking motion of the main shaft 26, lever or crank 66 rocks anticlockwise, to the left, being carried by the switch pin bar 64, and as a result, pins 64X, 64Y, on said bar, and pin 68 (abutted by slot 69 margin) all shift to the left, pin 64Y bearing against pivoted bar 158 to rock the latter anticlockwise into locked condition by armature 157, thereby again opening contact blades 160, so that the master lock coil 165 cannot again be energized by a closing of the master switch 150 until the operating cycle is completed.

Leftward or initial movement of pin bar 64 also causes pin 64X to carry or rock the pivoted lock bar 168 to the left to be locked by its locking armature 169 in the event that this lock bar happened at that time to have been unlocked or released; in this condition, with pin 64X shifted to the left, switch blades 170 for the hold circuit spring open as an incident to control of the holding circuit hereinafter described.

Such leftward movement of bar 64 also rocks timer shaft crank 66 anticlockwise, causing the switch cam 172 to be moved toward the left owing to the pin and slot connection 172Z with crank 66, which in turn causes the detecting wiper arm 173, pinned thereto at 174, to rock toward the left into starting position with regard to its collecting or totalizing contact bank, and in this condition of the parts, the cam rise 172X is away from the roller 175, and cam switch contacts 163, and others, open, so that the operating ground circuit through conductor 164 for master lock coil 165 is broken.

At this time, it may be observed also, that contacts 176 from ground 177 are likewise open, so that an operating ground circuit via conductor 178 is also broken and no holding selection can be made at this time regardless of the condition of the lock bar 168 of the master holding relay.

The parts are now in an initial or cocked starting position, and particularly the pin bar 64 is shifted to the left; so is the detector or collector wiper 173, and so is a reset bar 180 pinned to crank 66 at 179, the leftward extremity of this reset bar being elevated by reason of an offset slot 181 therein, which rises on roller 182 on crank 65.

When the reset bar 180 first shifts toward the left, its left extremity does not rise because crank 65 is turning the same way, and therefore a reset cam lug 183 is enabled to pass under a pin 184 on the common hold reset bar 128; however, the reverse or return motion of crank 65, when the main shaft 26 triggers out, raises this end of the reset bar 180, owing to action of roller 182 in its cam slot thereon, and the governor-controlled slower motion of said bar, so that lug 183 is elevated into alignment with pin 194 to cam the latter, and hence the common reset bar 128 outwardly of the chassis, i. e. in a direction toward the observer in Figs. 1 and 6; spring 185 urging reset bar 180 (and timer crank 66) in this return action.

The aforesaid, leftward, depressed, initial shifting of reset bar 180 also enables pin 186 thereon to pass beneath certain supervisory switch means including a switch blade having a cam boss 187 which will, however, be engaged by said pin 186 on its return travel in elevated position as aforesaid for purposes later described in the control circuit.

There is some hesitancy of the parts in the foregoing initial, setting or cocking position (to the left) during the short interval while the impositive actuating linkage between the actuating lever 14 and main shaft 26 trips or triggers out (as at 27—29, Fig. 2) and the spring 35 of Fig. 2 returns the main shaft with a clockwise motion in Fig. 6, this latter motion being relatively abrupt and fast, while spring 185 of Fig. 6 returns reset bar 180 toward the right relatively slowly because of connection to timer crank 66 at 179 and turning of timer shaft 67, the rate of which is governed by the timer gear train device 78 of Fig. 2.

Accordingly, the return motion of reset bar 180 is slow to permit accurate detection impulsing through the wiper switch totalizer means 173, 173X, 173Y, as the same returns to the normal, at rest, condition shown in Fig. 6.

Assuming an operation where no selector is held, and assuming an initial or advanced condition of the parts as just previously described, the totalizer wiper 173 and all selector wiper panels 100a and 100b would be displaced fully toward the left and beyond the leftmost or starting contacts in each bank.

Totalizer wiper 173 idles in this extreme, leftward, position while the selecting pawls are triggered and begin their return toward the right to selecting positions determined by the depth of the slots in discs 41 or 42 into which the rollers 90 drop; and in thus returning toward the right, wiper panels, and hence the contacts thereon, will necessarily pass over the first pair of contacts 200a, 200b in their respective banks, while the totalizer wiper contacts 173X and 173Y will start to travel back toward the right and over their non-index contacts 201, 202 after the last selecting pawl has gone home into a selecting position.

If any selecting pawl should hang up, i. e. become stuck on the peripheral portions of the selecting slots 44 on a dead center, the corresponding wiper panel, and hence its contacts, would never pass first-position non-index contacts 200a, 200b, but would remain thereon, and as a result a circuit would be completed to energize the coil 204 of the timer lock magnet shown in Figs. 6 and 2, thereby projecting a rubber-tipped lug 205 on the armature thereof into the path of one of the governor fan blades 80 to stop the timer, and hence shaft 67, thereby preventing return of the totalizer wiper 173 until such time as the selector pawl is dislodged from hung-up condition; actually this generally happens by mere vibration from operation of some other parts of the machine, since the dead-center, when it arises on occasion, is a delicately balanced condition easily disturbed because selector discs 41, 42, etc. spin with complete freedom and but little torque.

The foregoing non-indexing circuit is completed from ground 206, battery or power 207, lock-out coil 204 conductor 208 in parallel with one, each, of the non-index contacts 200a, 200b, conductor 209 in parallel with one, each, of the remaining contacts 200a, 200b, through totalizer non-index contacts 201, 202, when bridged by the wiper contacts 173X, 173Y, to ground 210.

In the usual case, all of the selecting wipers travel toward the right (unless intentionally held) past non-index position and become lodged on various combinations of contacts on their respective banks.

Assuming, accordingly, one example, where said wipers stop respectively at the first pair of contacts encountered after leaving said non-index contacts; a circuit would be set up from ground 211 to looped contacts 212, and the looped wiper contacts 213 would bridge a circuit to contact 214 connecting over to another contact 215 in the adjoining bank, thence through looped wiper contacts 216 (at this time on contact 215 and 217) to the looped pair of contacts 218 on the totalizer bank.

Thus, it appears that ground has been connected by the selectors to two contacts 218 on the totalizer bank, and when the detecting or totalizing wiper contact 173X passes over these live contacts, circuit will be completed twice from said contacts 218 through wiper contacts 173X and 173Y to the common wiper bar or segment 219 of the totalizer switch (on which the wiper finger 173Y rides), conductor 220, master impulse relay coil 221, battery 222, conductor 223 through closed armature contact 224 on a master power relay to master ground 225.

The master power relay pulls up and locks via the following circuit: from ground 226, battery 227, master relay coil 228, conductor 229, cam switch blades 230 to ground 231, it being observed that said cam switch contacts 230 are momentarily closed when reset bar pin 186 passes against projection 187 on the rightward return motion of said bar, so that master power relay contact 232 is attracted against holding contact 233 to shunt the cam switch contacts 230 and set up a holding circuit for said relay; this holding circuit will continue to hold up so long as there is not interruption to the main power supply.

At this juncture it is important to state that for purposes of simplifying the wiring diagram of the foregoing control circuit, the power supply has been indicated by a conventional battery symbol for each element energized, whereas in practice, a common power connection is provided from the usual main line power outlet, and it is this main power supply which would also energize the master power coil 228 in place of the symbolic battery source 227 shown in Fig. 6; whenever this power supply fails, master relay contacts 232, 233 separate and open the main power supply, in this illustrative instance, by opening of the master ground contacts 224, 225.

Returning to the totalizer switch, which was described as deriving two impulses from the particular combination of totalized selector contacts detected, impulse relay 221 will likewise be impulsed twice, giving two closures of impulse contacts 235, 236, thus completing circuit twice from ground 237 through register coil 238, power (battery) connection 239 and the master relay conductor 223, so that said register coil is likewise twice impulsed, causing a conventional ratchet step-up mechanism to advance a totalizing or indicating dial 240 two steps to indicate the result, as by display of numbers on disc 240, of the particular combination of selector bank contacts set up.

As another example of selection, assume that the wipers were permitted to advance, toward the right, and the extreme positions shown in Fig. 6; in addition to the two-impulse circuits set up via bank contacts 212, 214, 215, 217, just described, another combination could be set up if contacts 213 stopped on contacts 242, 243 and wiper contacts 216 stopped on the three bank contacts 244. In this case, circuit would be completed from ground 211, contacts 212 looped to contact 242, thence through wipers 213, conductor 245 looping to one of the three contacts 244, all interconnected by wiper contacts 216, conductor 246 to three looped contacts 247 on the totalizer bank; but since, in this example, three other totalizer contacts 248 are also looped at 249 to one of the three contacts 244, a total of six contacts, 247, 248, are hot or in circuit on the totalizer bank, and wiper 173 will cause six impulses to be passed to the impulse relay coil 221 with a corresponding actuation of the indicator or register means 238—240 or other instrumentality to be controlled thereby.

While other examples are present in the limited showing possible in the space of Fig. 6, it will now be apparent to those skilled in the art that a vast number of combinations and permutations of contact interconnections may be set up on the banks of contacts on panels 107, 108 (Fig. 1) and such additional panels and associated selecting pawl mechanisms as may be utilized, it being noted again that for purposes of simplicity in illustrating one embodiment of this invention, only two such panels and selectors have been shown and described.

Another feature of the invention pertains to a control for holding any selector against selecting operation while the others are actuated, mechanical aspects of this feature having been described heretofore in view of Fig. 5.

The operator of the machine, before actuating the same by the lever means 14, may hold any one of the selectors (assuming a larger number used than shown or a larger number of circuit selections) by closing a hold switch with contacts 250, Fig. 6, thereby applying ground from conductor 178, ground 177, to hold coil 122, and attracting its plunger 121 to move blocking lever 118 into the path of the selector pawl of wiper 100b, it being recalled that locking pawl means 125 (Fig. 5) will automatically hold the associated blocking lever in blocking position until released by one of two means.

Whenever a hold coil is energized as aforesaid, the common hold reset bar 128 (Figs. 5 and 6) is mechanically shifted toward the right by locking pawl tail 131 acting against bar pin 130, and a hold supervisory switch (Fig. 6) 255 closes circuit from ground 256 through cam switch contacts 257, closed, conductor 258, hold supervisory or rocking relay coil 259, power battery 260, to ground 261, thus attracting armature 169 and freeing the rocking lever 168 for clockwise spring motion so that its pin 168X will open contacts 264 and disconnect power from battery source 265 to extinguish the hold ready signal lamp 266.

As a further result of the foregoing operation of the hold locking or supervisory relay aforesaid, hold coil supervisory contacts 268 are opened by movement to the right of pin 168X, thus disconnecting power from battery 265, via conductor 270, which supplies power to all hold coils 122, 121A.

Each initial advance of pin bar 64 toward the left, resets the hold supervisory lever 168, closing supervisory contacts 268 so that the hold coils may be energized by the operator, as by closing hold switch contacts 250 or 250X.

If, after making a hold selection as aforesaid, the operator wishes to cancel the same, he may close cancelling switch contacts 280, thereby connecting ground 281 through coil 133 (seen in Fig. 3) so that said coil will be energized from power battery 282 grounded at 283, thus shifting the common hold reset bar 128 toward the left so that pins 130 thereon bear against locking pawl tails 131 to free the blocking levers associated therewith.

A similar shifting of the reset bar 128 occurs at each operation of the device upon return, right, of the arm 180, the cam lug 183 of which (now up behind pin 184 on bar 128) cams said pin 184 to reset said bar 128 and free any blocking lever 118 that might have been in hold position theretofore, it being recalled that such return of the arm 180 is slow and occurs after the selectors have operated.

A peculiarity of operation of the cam arm 180 should be here noted; upon initial or setting movement of this bar or arm, and the companion pin bar 64, toward the left, the cam bar 180 jumps up, as soon as the triggering or tripping-out operation occurs, by reason of the offset slot 181 engaging roller 182, which snaps over toward the right at this time, in consequence of which, pin 186 almost at once closes cam switch contacts 257 (and 230) to complete the supervisory hold circuit through switch 255 and the hold locking relay coil 259; this happens before cam 183 shifts the common hold reset bar 128, so that if there has previously been a hold, switch 255 will remain closed long enough for completion of a circuit through coil 259 to unlock or free the hold lock lever 168, which is spring turned clockwise to open hold locking switch 268 so that no holding operation may at this time be effected.

Thereafter, in point of time and travel of bar 130, bar 128 will be cam-shifted to reset the holding levers and locks and totalizing begins.

Therefore, there can be no holding unless switch 268 is closed, and this occurs only when pin bar 64 shifts to initial (left) position at the beginning of each cycle (of course lever 168 on the locking relay may not have been previously released). On the other hand, said initial (leftward) movement of the bars causes cam 172 to open the first cam switch contact 176, thereby disabling the hold circuit via conductor 178, by reason of which it is apparent that any holding must be effected before the cycle is started; moreover, if a hold is made properly as aforesaid, the supervisory switch means will initially be closed at 255, and after the cycle starts, second cam switch 257 will close to open hold locking contacts 268 and break the main holding circuit, and this circuit can then only be restored by another leftward shifting of pin bar 64, which means initiation of another cycle of operation; but once such cycle is started, the holding circuit is also broken at first cam switch contacts 176 as aforesaid; thus, holding can only be effected at certain times.

Accordingly, the hold signal is utilized to indicate those times when the hold may be made, while the hold supervisory means 168, 259, 257, 255, and 172—176 control attempted operations at times when it is undesirable that the holding means be actuated.

Where a large number of selectors are used and said holding features are employed, individual signals in the form of lamps 290 or 290a, associated with each hold circuit and selector may be energized from switches 294a, 294b, etc. each operatively associated with a corresponding hold plunger 121 (see Fig. 5, 5–A) to be closed thereby when the corresponding hold coils are energized, thereby illuminating the corresponding light, e. g. from battery 291a or 291b grounded at 292a or 292b.

For simplification in the diagram of Fig. 6, the reset supervisory hold switch 255 has been shown and described as actuated by the main hold coil reset bar 128; however, in the preferred construction, as depicted in Fig. 5–A, it is preferred to have an auxiliary reset bar 128X slidable under the hold coils 122 and having pins 128W lying in the path of each blocking lever 118, such that blocking movement of any of the latter levers shifts bar 128X toward the right, pressing a downturned, rubber-jacketed end 128Z of said bar 128X (Fig. 2) against the blades of switch 255 to close the latter so long as any blocking lever 118 remains in blocking position to hold a selector, a spring 128Y (Fig. 3) restoring said auxiliary reset bar 128X toward the left (Fig. 5–A) when the master or main reset bar 128 is shifted in one of the manners aforesaid (i. e. automatically or selectively).

In summary, the invention pertains to control circuit means cooperable with selectors and actuating mechanism therefor operable to move the selectors to an initial or starting position, also referred to as an indexing position, to move the selector discs, to trigger the selectors at a certain time, and to time the movements of a reset cam bar (180) and a pin bar (64), with impositive or yieldable driving connections for the selectors and associated parts (55A, 61, etc.) to permit holding of any selector against effective movement while other selectors are actuated, said circuit means including a master operating switch, a master power switch, a master lock coil, selectively operable hold coils for each selector, a master cancelling coil, supervisory switch means and locking relays and cam switches for determining the times when holding may be effected, hold signalling circuits, a totalizer switch operable at a certain time during each cycle, indexing contacts for each selector and an indexing test circuit through the totalizer switch with lockout means for arresting the cycle should any selector pawl be hung up on dead center, and means for setting up a variety of circuits through each selector for giving numbers of impulses detected or picked up by the totalizer and to be utilized for any desired purpose, for example to operate some type of totalizer or like impulse operated instrumentality.

I claim:

1. A control circuit for a device of the class described including selectors movable various distances over selector contacts from a starting position and mechanism for moving said selectors, said circuit comprising: a series of totalizing contacts; connections between said selector contacts established through said selectors to predetermined totalizing contacts aforesaid which are dependent in total number upon the distances said selectors are moved and the predetermined arrangement of said selector contact connections aforesaid, and an impulse circuit completed through said totalizing contacts and selector contacts, together with a totalizer contactor and mechanism for moving same over said totalizing contacts and coacting with said first-mentioned mechanism for moving said selectors, to detect the number of impulses set up in said impulse circuit for each operation of said selectors.

2. A control circuit including a series of totalizing contacts, a detector contact movable over said series from a starting position, a plurality of banks of selector contacts each having a selector wiper movable thereover from a starting position, mechanism for moving said detector contact and all selector wipers to starting position and thereafter moving all said wipers to random positions on respective banks and thereafter moving said detector contact over said totalizing contacts, together with impulse circuits set up through said selector contacts, said wipers in one or another position on the banks, said totalizing contacts and said detector contact for deriving various numbers of impulses from said impulse circuits dependent upon the random positions of said wipers.

3. A permutation and combination circuit including a plurality of selectors movable back and forth over corresponding banks of selector contacts between starting and selecting positions, a bank of totalizing contacts and a totalizer contact movable back and forth thereover between a starting and a terminal position, mechanism operable for moving said selectors and totalizer contact to starting position and holding the latter contact thereat while said selectors are advanced random amounts to various selecting positions, and thereafter moving said totalizer contact over said totalizing contacts to complete an impulse circuit, and impulse-circuit connections between selector contacts interconnected variously by said selectors and completed through said totalizing and totalizer contacts.

4. Apparatus as defined in claim 3 and further characterized in that said selectors are holdable from selecting movement, said apparatus further including means releasably holding any selector, electromagnetic means for holdably operating and releasably operating any said holding means.

5. Apparatus as defined in claim 4 and further including supervisory switch means actuated cooperably with said moving mechanism for rendering said electromagnetic hold operating means ineffective at predetermined times in each cycle of operation of said moving mechanism.

6. Apparatus as defined in claim 3 and further provided with a master actuating lever for said moving mechanism, an electromagnetic master lock for said lever, a master switch and circuit operable to actuate said lock and unlock said lever for operation, said moving mechanism operating in cycles, and supervisory switch means in said circuit and actuated at certain times cooperbly with said moving mechanism during each said cycle, for rendering said master switch circuit ineffective to unlock said lever.

7. Apparatus as defined in claim 3 and further provided with indexing means including indexing contacts for each selector at selecting starting position therefor, indexing contacts on said bank of totalizing contacts at totalizing starting position thereon, an electromagnetic lockout for said moving mechanism and operated to stop said mechanism during any cycle responsive to the condition where one or more selectors fail to leave starting position while said totalizer contact remains at starting position, and circuit connections between said indexing contacts and completed through corresponding selectors and said totalizer contact for actuating said lockout under the conditions and for the purposes aforesaid.

8. Apparatus as defined in claim 3 and further provided with a master power relay connected to be impulsed once during each operating cycle of said moving mechanism by switch means cooperable with said mechanism, a holding circuit set up for said relay each time it is impulsed as aforesaid, and a master power connection maintained by said relay when operated by said holding circuit and connected with said impulse circuit to render the latter effective for impulse purposes so long as said relay maintains said power connection as aforesaid.

9. Apparatus as defined in claim 4 and further provided with hold signal means and control means therefor actuated by said moving mechanism to give an indication at one time during each operating cycle thereof that a circuit for said electromagnetic holding means is in condition for operation, and at another time relative to said cycle that said circuit is not in condition for operation, and electric circuit control means controlled by said moving mechanism during each cycle for rendering said electromagnetic holding means circuit inoperative at certain times, and operative at other times.

10. In a device of the class described, selectors movable to determine selecting positions for selector switches, selector contacts, selector switches variously positioned by said selectors on different arrangements and combinations of said selector contacts setting up impulse circuit connections, a totalizer switch movable over totalizing contacts connected with said selector contacts to collect impulses from circuit connections set up by said selector switches as aforesaid, and actuating mechanism for operating said selectors, selector switches, and totalizer switch in the sequence named to set up circuits as aforesaid in cyclic operation.

11. Apparatus as set forth in claim 10 and further characterized in that each cycle of operation thereof includes a starting position to which said selector switches and said totalizer switch are respectively moved at the beginning of each said cycle, and said actuating mechanism includes means for holding said totalizer switch at starting position for an interval during which said mechanism causes said selector switches to be moved from starting position to selecting positions and thereafter causes said totalizer switch to move from starting position in totalizing operation.

12. Apparatus as set forth in claim 11 and further characterized in that said selector switches have yieldable driving connection with said actuating mechanism such that any selector switch may be held against selecting operation, said apparatus further including electromagnetic means selectively operable for holding any said selector switch against selecting operation, and against moving from a selecting to starting position.

13. Apparatus as set forth in claim 12 and further provided with indexing means including index contacts at each starting position for selector and totalizer switches, an electromagnetic lockout for said actuating mechanism, and a lockout circuit for operatively energizing said lockout to stop said mechanism from effecting operation of said totalizer switch, at least, should any selector switch fail to leave starting position during the aforesaid interval, said lockout circuit being completed through any selector switch and associated index contacts and said totalizer switch and associated index contacts.

14. Permutation and combination circuit means including a cyclically operable actuating mechanism, a plurality of selecting switches each moved by said mechanism to a starting position and thereafter into selecting positions to set up various impulse circuits, said selecting switches being holdable against movement from a selecting position into said starting position, means for holding desired selecting switches as aforesaid, means for cancelling the holding operation of said holding means, totalizing means coacting with said mechanism for operation at a time during each cycle of operation thereof, following selecting operation of one or more selecting switches, for deriving a totality of impulses from said impulse circuits, and means coacting with said mechanism for preventing effective operation of said holding means at certain times during each said cycle.

15. Permutation and combination circuit means including a cyclically operable actuating mechanism, a plurality of selector switches each movable by said mechanism to a starting position and thereafter into various selecting positions to establish various impulse circuits, said selector switches being holdable against movement from a selecting to starting position, selectively operable electromagnetic holding means for holding any selector switch as aforesaid, electromagnetic cancelling means for rendering ineffective the holding of any selector switch by the holding means as aforesaid, totalizer switch means coacting with said actuating mechanism following selecting operation of one or more of said selector switches during any operating cycle to derive a totality of impulses from any impulse circuit established thereby, and supervisory switch and relay means coacting with said holding means and said actuating mechanism for preventing holding action of said holding means at some time during each said cycle.

16. Permutation and combination circuit means including a cyclically operable actuating mechanism and slotted selector discs actuated thereby, a plurality of selector switches each movable by said mechanism to a starting position and thereafter freed for movement variously into selecting slots in corresponding selector discs aforesaid whereby to establish various impulse circuits, said selector switches being holdable against movement from selecting to starting positions, selectively operable electromagnetic holding means for holding any selector switch as aforesaid, totalizer switch means actuated by said mechanism for movement into and from a starting position during each operating cycle to derive impulses from impulse circuits established as aforesaid, supervisory-circuit switch means cooperable with said actuating mechanism and holding means for rendering the latter ineffective in holding action at certain times during an operating cycle, an electromagnetic lockout operable to stop operation of said mechanism, and a non-index circuit operating said lockout through circuit connection with index contact means at the starting positions of one or more of said selector switches and said totalizer switch under condition where a said selector switch fails to leave starting position while the totalizer switch is in said position.

17. In a permutation-combination device of the class described including an actuating mechanism having a main shaft moved into starting cocked position and automatically tripped-out therefrom in an opposite direction, improvements including to wit: a pin bar 64 reciprocated by said shaft, relay means set by said bar responsive to reciprocatory motion thereof, a cam reset bar 180 reciprocated by said shaft, totalizer switch means 172—173 oscillated by said reset bar, said pin bar and said reset bar moving codirectionally to a starting position under urgence of said main shaft tripped-out, timer means slowing movement of said reset bar to starting position relative to such movement of the pin bar, cam means 181—182 correlated to movement to starting position of said pin bar for elevating said reset bar during movement to starting position, selector switches actuated by said mechanism to establish impulse circuits, electromagnetic control means cooperable with said mechanism and said selector switches, supervisory switch means actuated by said reset bar in elevated condition as aforesaid, additional supervisory switch means cooperable with said totalizer switch means, and control-circuit connections through said supervisory switch means, and said relay means for said electromagnetic control means, said totalizer switch means operating to provide a totality of impulses derived from said impulse circuits during each complete operative cycle of said main shaft.

18. In a permutation and combination device of the class described including an actuating mechanism, totalizer and selector switch means moved thereby into starting positions and thereafter caused to be moved thereby in respective totalizing and selecting operations, a timer gear train including a governor and operably coacting with said mechanism to regulate the rate of movement of parts of said mechanism, an electromagnetic lockout including a blocking part actuated thereby to block said governor and stop said mechanism, and a lockout circuit established by said totalizer and selector switch means in starting position for actuating said lockout to stop said mechanism.

19. In a circuit-selecting mechanism, a plurality of selector switches movable from starting to selecting positions and mechanism for moving said switches accordingly, said switches holdable against movement from selecting to said starting position, holding levers for each selector switch, electromagnetic means selectively operable to move any holding lever into holding relation with its selector switch, a common reset member for all holding levers, electromagnetic reset means actuating said reset member in resetting operation, and supervisory switch means connected to control operating circuits for said electromagnetic means and actuated cooperatively with movement of any said holding lever into holding relation as aforesaid.

20. In a control circuit, in combination, a plurality of oscillatable selector switches, a totalizer switch also oscillatable, actuating mechanism acting cyclically to move said switches substantially simultaneously into an indexing position, an electrically controlled lockout operable to prevent actuation of said mechanism, means controlled by said mechanism for moving indexed selector switches from indexing to selecting positions, a second means for moving said totalizer switch from indexing through totalizing position at a time during said cycle after said selector switches shall have been actuated by said first-named means for movement from indexing to selecting positions, index contacts in indexing position of all selector switches and said totalizer switch, and an index-control circuit for operating said lockout established through the index contacts of any said selector switch, contact means on said selector switch engaging the corresponding index contacts in indexing position of said switch, and the index contacts of said totalizer switch and contact means thereon engaged with the said index contacts thereof in indexing position of said totalizer switch.

21. In a device of the class described, in combination, a plurality of spinning discs each having selecting notches of various depth therein, mechanism for spinning said discs, a multi-contact selector switch for each disc, a selector wiper for each selector switch, means coacting with said mechanism and including a notch-engaging, wiper-positioning feeler for each selector wiper and actuated to position the corresponding wiper on certain selector contacts dependent upon the depth of said disc notches presented to said feelers as a result of spinning of the corresponding discs, a bank of totalizer contacts connected in an impulsing circuit in impulse-groups of varying impulse number value, certain of said groups being connected to certain of said selector contacts, a totalizer wiper actuated cooperably with said mechanism in each operation of the latter for successively engaging said totalizer contacts, and an impulse-operated device impulsed by said impulsing circuit through said totalizer wiper a number of times depending upon the impulse value determined by said selector switches.

22. Mechanism for producing pulses and comprising: a set of pulse-totalizing contacts and a totalizing contactor movable thereover; selecting switch means including a set of selector contacts connected variously to different numbers of said totalizer contacts to provide pre-assigned pulse values, and a selector contactor movable different distances over a predetermined path of travel to engage different selector contacts depending upon its position along said path; a revoluble selection-determining member having a plurality of selection-formations of different dimension located thereon; feeler means cooperable with said selector contactor and engageable with said selection formations to position the selector contactor at positions along said path on different selector contacts, depending upon the angular position of said determining member relative to said feeler means and the selections formations engaged by the latter; actuating mechanism operable to produce in succession a turning of said selection-determining member, movement of said feeler means to engage a selection formation to locate said selector contactor at one or another selector contact position as aforesaid, and thereafter to move said totalizing contactor over said pulse-totalizing contacts; and a pulse circuit established from a source of power through said selector contacts, selector contactor, said totalizer contacts and totalizing contactor, for producing a number of pulses in said circuit determined by the number of totalizing contacts included in said circuit under control of said selecting switch means for any totalizing operation of said totalizing contactor responsive to operations of the actuating mechanism as aforesaid.

23. In a selecting mechanism, in combination, spinning selector discs, multi-contact selector switches positionally controlled by said discs to engage various selector contacts comprising part of said selector switches, a totalizing switch including a series of totalizing contacts and a pulse contactor operable to engage the totalizing contacts sequentially, certain selector contacts being connected to certain groups of sequentially located totalizer contacts the number of which, in each said group, determines the pulse value of the associated selector contacts, a pulse circuit including connection from a source of pulsing power set up through said selecting switches, said totalizer contacts and said pulsing contactor, in series, to produce a number of pulses responsive to movement of said pulse contactor sequentially over said totalizer contacts, together with actuating mechanism operable to spin said discs, actuate said selector switches to selecting positions determined by said discs, and thereafter actuate said totalizer switch to move said pulse contactor sequentially over said totalizer contacts and complete said pulsing circuit a number of times determined by the totalizer contacts connected in said circuit by said selector switches, a pulse relay means in said circuit, and adapted for connection in an external circuit to be pulse-controlled, and holding mechanism including means for selectively preventing effective selecting operation of any said selector switch by the actuating mechanism, as aforesaid.

FRANK G. NICOLAUS.

References Cited in the file of this patent

UNITED STATES PATENTS

| Number | Name | Date |
|---|---|---|
| 449,108 | Desant | Mar. 31, 1891 |
| 2,012,544 | O'Neil | Aug. 27, 1935 |
| 2,125,236 | Edgeworth | July 26, 1938 |
| 2,254,619 | Meyer | Sept. 2, 1941 |